United States Patent Office 3,397,996
Patented Aug. 20, 1968

3,397,996
ALL-PURPOSE SHORTENING COMPOSITION
Richard T. Darragh, Colerain Township, Hamilton County, and Kenneth W. Nelson, Sharonville, Ohio, assignors to The Procter & Gamble Company, Cincinnati, Ohio, a corporation of Ohio
No Drawing. Filed Dec. 29, 1964, Ser. No. 422,048
9 Claims. (Cl. 99—118)

ABSTRACT OF THE DISCLOSURE

All-purpose, glyceride shortening composition suitable for the preparation of cakes and icings, which contains a combination of four additives:

(a) monoglyceride;
(b) polyoxyethylene sorbitan monoester;
(c) decaglycerol ester; and
(d) half ester of dicarboxylic acid with monoester of straight chain aliphatic diol.

---

This invention relates to a novel shortening composition. More particularly, this invention relates to an all-purpose baker's shortening which is equal to or better than conventional baker's shortenings in its ability to produce under commercial conditions both high volume cakes and related baked products having fineness and softness in texture and stable cream icings having high specific volume.

It has been known for many years that improvements in shortenings suitable for cake baking purposes, particularly for cakes of the so-called "high-ratio" variety, can be obtained by the employment of mono- and diglycerides or so-called superglycerinated fats in the shortenings. More recently, numerous other emulsifier-type substances have been suggested for use in cake shortenings. Examples of the more recently developed emulsifying agents for cake baking purposes are propylene glycol monostearate, critic acid esters of monoglyceride and lactylated esters of various sorts. Although many of the newer type emulsifiers are reported to be equivalent to or better than conventional mono- and diglycerides, shortening technologists continue to search for more universally suitable emulsifying agents or combinations of emulsifying agents which can be used by bakers to improve their baking operations and the quality of their products. While some of the newer emulsifying agents greatly improve upon certain properties and characteristics of shortening, they frequently introduce other undesirable properties which, on balance, tend to offset the improvements obtained by their presence.

In a study of the problems relating to all-purpose shortenings for commercial bakeries, it has been unexpectedly discovered that a unique combination of shortening additives can be used to improve the quality of commercially prepared bakery products. Accordingly, the primary object of this invention is to provide an all-purpose baker's shortening containing such a combination of additives. It is a further object of this invention to provide a process for preparing an all-purpose shortening particularly useful in the commercial production of cakes, related baked products and icings. And a still further object of this invention is to provide a commercial bakery shortening which contains at least four emulsifying agents, the combined presence of which produces an all-purpose shortening product.

In general, the invention comprises an all-purpose glyceride shortening composition suitable for use in commercial baking operations containing as additives, by weight of the composition, from about 0.5% to about 5.0% monoglyceride containing fatty acid groups having from about 14 to about 22 carbon atoms, from about 0.5% to about 2.0% polyoxyethylene sorbitan monoester containing fatty acid groups having from about 14 to about 22 carbon atoms and containing an average of about 20 oxyethylene units per molecule, from about 0.25% to about 2.0% decaglycerol ester containing from about 2 to about 5 fatty acid groups having from about 14 to about 22 carbon atoms, and from about 0.1% to about 5.0% half ester of dicarboxylic acid containing from 3 to 6 carbon atoms and fatty acid monoester of straight chain aliphatic diol, said diol containing from 3 to 6 carbon atoms and said fatty acid having from about 14 to about 22 carbon atoms.

Although the precise mechanism by which the additives of this invention cooperate is not completely understood, it is known that substantially improved performance is obtained with these additives in an all-purpose shortening system which is suitable with plastic as well as liquid base fats and oils. Improvements are obtained in cake and icing volume with such all-purpose shortening systems employing these additives in combination in comparison to similar type shortening systems from which one or more of these additives is left out.

Some of the additives of this invention are commercially available and have been previously known to be useful in shortenings. The present invention is not predicated on the use of these additives in shortening either alone or in binary or tertiary combination but rather invention is claimed to reside in the unique combination of all four of the above-defined additives in the concentrations described and in the shortening improvements obtained with this combination.

The glyceride shortening base in which the additives of this invention are employed can be plastic, liquid, or a suspension of solids in liquid oils of animal, vegetable or marine origin. These shortening components can be saturated or unsaturated and they can be, or can be derived from, naturally-occurring fats and oils as well as synthetically-prepared glycerides or fractions or mixtures thereof. In general, these glycerides contain fatty acid groups having from about 12 to about 24 carbon atoms such as the fatty acid groups of lauric, myristic, palmitic, stearic, oleic, linoleic, linolenic, arachidic, behenic, and erucic acids.

Examples of suitable base oils are cottonseed, soybean, peanut, safflower, sesame, sunflower and rapeseed oils. Fish oils such as herring, menhaden, and whale oil also can be used. Lard and tallow are typical examples of plastic animal fats which can be used as the glyceride shortening base in the practice of this invention.

The glyceride base can be processed or crystallized in various ways. For example, one method is to melt the desired glyceride composition and then supercool rapidly from the molten state to a temperature below the solidifying point of the fat in an apparatus such as a "Votator" freezer described in Vogt, U.S. Patent Re. 21,406, granted Mar. 19, 1940 and U.S. Patent 1,783,864, granted Sept. 15, 1946. Another method of processing is to form a uniform suspension of high melting solids in liquid according to the teachings of Holman and Quimby, U.S. Patent 2,521,219, and Mitchell U.S. Patent 2,521,241, both granted Sept. 5, 1950; Holman and Sanders, U.S. Patent 2,815,285 and Andre and Going, U.S. Patent 2,815,286, both granted Dec. 3, 1957. Other suitable treatment consists of interesterifying mixtures of fatty triglycerides to give a random distribution of the triglycerides or low temperature, directed interesterification such as taught by Eckey, U.S. Patents 2,442,531 to 2,442,539, inclusive, granted June 1, 1948, and Holman and Going U.S. Patents 2,875,066–7, granted Feb. 24, 1959.

Although specific illustrative examples of glyceride shortening bases and methods of processing are described herein, this should not be taken as limiting the invention to any particular glyceride shortening base or method of processing.

An essential and critical part of the invention is the employment in the glyceride shortening base of the hereinbefore described combination of four additives. As mentioned above, some of these additives can be purchased commercially. In general, however, they can be prepared as follows:

The monoglycerides used in the shortening composition of this invention can be pure esters of glycerol and fatty acids having from about 14 to about 22 carbon atoms such as, for example, monobehenin, monoolein, and monostearin, or mixtures of esters containing such fatty acids. They are conveniently prepared by the superglycerination of fats or oils which consists of reacting triglyceride fat or oil, for example, cottonseed or soybean oil, with excess glycerine in the presence of an alkaline catalyst such as sodium hydroxide.

Edeler and Richardson, U.S. Patents 2,206,167–8, granted July 2, 1940, describe typical methods of making edible mono- and diglycerides by the superglycerination of fat. These mono- and diglyceride mixtures usually contain on the order of 40% to 60% monoglyceride, the balance comprising diglyceride and a smaller percentage of triglyceride. Such mixtures can be used in the practice of this invention provided that the total monoglyceride content in the glyceride shortening composition is from about 0.5% to about 5.0% as set forth herein. The so-called "distilled" monoglyceride products which are characterized by having a higher monoglyceride content, commonly on the order of 90% or more, can also be used. Such products are marketed under the trademark Myverol and methods of making are described by Kuhrt, U.S. Patents 2,634,278–9, granted Apr. 7, 1953, Kuhrt, U.S. Patent 2,701,769, granted Feb. 8, 1955, and Kuhrt and Welsh, U.S. Patent 2,727,913, granted Dec. 20, 1955. A preferred monoglyceride is derived from partially hydrogenated vegetable oils (iodine value about 70 to about 80) containing fatty acid groups having from about 16 to about 18 carbon atoms.

The polyoxyethylene sorbitan monoesters used in the practice of this invention can be prepared, for example, by reacting polyoxyethylene sorbitan with fatty acids having from about 14 to about 22 carbon atoms, such as palmitic, stearic and oleic acids or mixtures thereof, or by forming polyoxyethylene ethers of partial fatty acid sorbitan esters. Suitable methods of preparation are described by Griffin, U.S. Patent 2,380,166, granted July 10, 1945 and commercially-available products are marketed under the trademark "Tween." In the preparation of these materials, a complex mixture of compounds is usually formed. Such mixtures are included within the scope of this invention. Polyoxyethylene (20) sorbitan monostearate which has an average of about 20 oxyethylene units per molecule is the preferred material in this group of emulsifiers.

When available as the commercial product, such as "Tween 60," it is preferred to acid treat the polyoxyethylene sorbitan monoester with sufficient acid to give it a pH of 6.5 to 7.0 in the presence of a trace of water. Edible acids such as phosphoric, citric, or hydrochloric acid can be used for this purpose. The trace of water need merely be an amount sufficient to enable the making of a conventional pH determination.

The decaglycerol esters used in this invention are polyglycerol esters containing 10 units of glycerol and from about 2 to about 5 fatty acid groups per molecule. The polyglycerol essentially is a polymer which is formed by the dehydration of glycerine. For each unit of glycerine that is added to the polymer chain there is an increase of one hydroxyl group and, in the practice of this invention, from about 2 to about 5 of these hydroxyl groups of the decaglycerol molecule form ester links with fatty acid having from about 14 to about 22 carbon atoms or mixtures thereof. It should be understood that in actual practice the decaglycerol ester will usually contain a mixture of components having an average of 10 glycerol units and an average of from about 2 to about 5 fatty acid groups. Such mixtures are within the scope of this invention. Suitable methods of forming these esters are disclosed by Harris, U.S. Patents 2,022,766 and 2,023,388, both granted Dec. 3, 1935, and in Belgian Patent 623,179 (1963). A preferred polyglycerol ester is a decaglycerol triester of partially hydrogenated vegetable oils (iodine value not exceeding about 45) containing fatty acid groups having from about 16 to about 18 carbon atoms.

The half esters of dicarboxylic acid and fatty acid monoesters of straight chain aliphatic diol include, for example, half esters of malonic, succinic, glutaric and adipic acid with a monoester of propylene glycol, 1,3-propanediol, 1,4-butanediol, 1,3-butanediol, or 1,5-pentanediol and palmitic, oleic, and stearic acids. These half esters can be prepared by esterifying the dicarboxylic acid with monofatty acid esters of diols by direct esterification. A convenient method of preparation is disclosed in Howard, U.S. Patents 3,145,107–9, granted Aug. 18, 1964, and Martin co-pending U.S. application, Ser. No. 319,643, filed Oct. 29, 1963. A preferred example of these half esters is stearoyl propylene glycol hydrogen succinate and a preferred range of concentration is from about 0.1% to about 1.0%.

Although specific illustrative examples of compounds useful in this invention and specific methods of preparing them are described herein, this should not be taken as limiting the invention to these particular additives and methods of preparation.

Some combinations of the above additives may give better over-all results than other combinations; for example, one especially preferred combination comprises about 5.0% partially hydrogenated and superglycerinated vegetable oil containing 40% monoglyceride of fatty acids having from about 16 to about 18 carbon atoms and having an iodine value of from about 70 to about 80, about 1.0% polyoxyethylene (20) sorbitan monostearate ("Tween 60") acid-treated to a pH of 6.5 to 7.0, about 0.5% decaglycerol triester of vegetable oil containing fatty acid groups having from about 16 to about 18 carbon atoms and hydrogenated to an iodine value of about 45, and about 0.25% stearoyl propylene glycol hydrogen succinate in a plastic glyceride shortening base.

Although the shortening of this invention has been described with particular reference to its use in cakes and icings, it should be understood that it is also useful for other general purposes such as the preparation of all types of chemically and yeast leavened sweet goods, doughnuts, cookies, bread, and so forth.

It should also be understood that the shortening of this invention can contain minor amounts of conventional anti-oxidants such as methyl silicone, butylated hydroxytoluene and butylated hydroxyanisole, preservatives such as sorbic acid, and coloring agents, for example, carotene.

The following examples will serve to further illustrate the shortening of this invention.

Example 1

A plastic shortening was prepared by homogeneously mixing together the following components:

| Component: | Parts by weight |
|---|---|
| Partially hydrogenated blend of soybean (85%) and cottonseed (15%) oils (Iodine Value—75) | 93.25 |
| Partially hydrogenated and superglycerinated vegetable oil (85% soybean oil; 15% cottonseed oil) containing 40% monoglycerides (Iodine Value—75) | 5 |
| Polyoxyethylene (20) sorbitan monostearate ("Tween 60"), acid-treated to a pH of 7.0 in the presence of a trace of water | 1 |
| Decaglycerol triester of partially hydrogenated vegetable oil, analyzed as decaglycerol triester of partially hydrogenated cottonseed oil—predominantly $C_{16}$–$C_{18}$ fatty acids ("Drewpol 10–3–Sh"—Iodine Value—maximum 45) | 0.5 |
| Stearoyl propylene glycol hydrogen succinate | 0.25 |

The above shortening was used to prepare high-ratio white and yellow cakes of high volume containing the following ingredients:

| Ingredients | Parts by Weight, grams | |
|---|---|---|
| | White Cake | Yellow Cake |
| Bleached cake flour | 454 | 454 |
| Shortening | 250 | 250 |
| Sugar, industrial fine | 636 | 636 |
| Salt (sodium chloride) | 17 | 17 |
| Baking powder (Fleischmann) | 28 | 28 |
| Fresh milk | 432 | 417 |
| Egg white (frozen) | 341 | |
| Whole egg (fresh) | | 272 |

The above cake ingredients were mixed in a Hobart C–100 mixer (3 quart bowl) with paddle at #1 speed and baked according to the following procedure:

Mix flour and shortening 90 seconds; scrape down and mix another 90 seconds. Add sugar, salt, baking powder and 182 grams of milk. Mix 90 seconds, scrape down, and mix another 90 seconds. Add half of the remaining milk and half of the egg. Mix 45 seconds, scrape down, and mix another 45 seconds. Add rest of milk and egg. Mix 45 seconds, scrape down, and mix another 45 seconds. Scale at 400 grams/8 inch pan. Bake at 375° F. for 20 minutes.

The above shortening was also used to prepare cream icings with high specific volume as follows:

| Ingredients: | Parts by weight Grams |
|---|---|
| Sugar 6X | 908 |
| Shortening | 227 |
| Nonfat milk solids | 57 |
| Salt (sodium chloride) | 7 |
| Water | 155 |

The above icing ingredients were added to a 3-quart mixing bowl and mixed at #2 speed on a Hobart C–100 mixer with paddle for 2 minutes, scraped down, and then mixed an additional 10 minutes at #2 speed.

The above cake and icing preparation was repeated three times with minor variations in the amount of additives in the glyceride base of the shortening as shown in the following table. The table also records the cake volume in ccs. per 400 grams of batter and the specific volume of the icing. The cake volume was determined 20 minutes after the cakes were removed from the oven. The specific volume of the icing is recorded as the reciprocal of density in grams per milliliter.

TABLE I

| | Weight Percent of Additives | | | | Cake, Volume | | Icing, Specific Volume |
|---|---|---|---|---|---|---|---|
| | MG | POESMS | PGE | SPGHS | White | Yellow | |
| (a) | 2.0 | 1.0 | 0.5 | 0.25 | 1,250 | 1,455 | 1.55 |
| (b) | 2.0 | 0.5 | 0.5 | 0.5 | 1,350 | 1,380 | 1.47 |
| (c) | 0.8 | 1.0 | 1.0 | 0.25 | 1,290 | 1,360 | 1.53 |
| (d) | 0.8 | 1.0 | 0.5 | 0.5 | 1,140 | 1,425 | 1.49 |

MG—Monoglyceride.
POESMS—Polyoxyethylene (20) sorbitan monostearate.
PGE—Polyglycerol ester.
SPGHS—Stearoyl propylene glycol hydrogen succinate.

By way of comparison with the above cake and icing results achieved with the additive combination of this invention, a shortening containing none of the above four additives produces a yellow cake with a volume of less than 1200 ccs. per 400 grams of batter, a white cake with a volume of less than 1050 ccs. per 400 grams of batter, and an icing with a specific volume of less than 1.35. A shortening containing the monoglyceride component (3.5% by weight) but not the other three additives of this invention produces a yellow cake with a volume of less than 1260 ccs. per 400 grams of batter, a white cake with a volume of less than 1100 ccs. per 400 grams of batter, and an icing with a specific volume of less than 1.35.

The following example further illustrates the high volume yellow cakes obtained with the shortening of this invention.

Example 2

High-ratio yellow cakes were prepared according to the formula and procedure of Example 1 with minor variations in the amount of additives in the glyceride base as shown in the following table. The table also records the cake volume in ccs. per 400 grams of batter as determined 20 minutes after the cakes were removed from the oven.

TABLE II

| | Weight Percent of Additives | | | | Yellow Cake, Volume |
|---|---|---|---|---|---|
| | MG | POESMS | PGE | SPGHS | |
| (a) | 2.0 | 0.5 | 1.0 | 0.5 | 1,300 |
| (b) | 2.0 | 0.5 | 1.0 | 0.25 | 1,380 |
| (c) | 0.8 | 0.5 | 0.5 | 0.25 | 1,385 |
| (d) | 0.8 | 0.5 | 1.0 | 0.5 | 1,385 |

Good cake baking results with cakes of high volume as in Examples 1 and 2 and good icing results with high specific volume as in Example 1 are obtained when partially hydrogenated peanut oil is substituted for the partially hydrogenated blend of soybean and cottonseed oils, when monobehenin is substituted for the specified monoglyceride, when polyoxyethylene (20) sorbitan monopalmitate is substituted for the polyoxyethylene (20) sorbitan monostearate, when the tetraester of decaglycerol and behenic acid is substituted for the specified polyglycerol triester, and when palmitoyl 1,4-butanediol hydrogen glutarate is substituted for the stearoyl propylene glycol hydrogen succinate in Examples 1 and 2.

Variations and modifications of the present invention can be made upon study of the foregoing disclosure by those skilled in the art. Such variations and modifications are intended to be within the spirit and scope of the invention as defined in the appended claims.

What is claimed is:

1. An all-purpose glyceride shortening composition for use in commercial baking operations containing as additives, by weight of the composition, (a) from about 0.5% to about 5.0% monoester of glycerol and fatty acid, (b) from about 0.5% to about 2.0% monoester of polyoxyethylene sorbitan containing about 20 oxyethylene units per molecule and fatty acid, (c) from about 0.25% to about 2.0% decaglycerol ester of fatty acid containing from about 2 to about 5 fatty acid groups per molecule, and (d) from about 0.1% to about 5.0% half ester of dicarboxylic acid containing from 3 to 6 carbon atoms and monoester of straight chain aliphatic diol containing from 3 to 6 carbon atoms and fatty acid, said fatty acids in (a) through (d) having from about 14 to about 22 carbon atoms.

2. The composition of claim 1 in which the glyceride shortening composition is a plastic shortening.

3. The composition of claim 1 in which the monoester of glycerol is derived from partially hydrogenated vegetable oil containing fatty acid groups having from about 16 to about 18 carbon atoms and having an iodine value of from about 70 to about 80.

4. The composition of claim 1 in which the monoester of polyoxyethylene sorbitan is polyoxyethylene (20) sorbitan monostearate.

5. The composition of claim 1 in which the monoester of polyoxyethylene sorbitan is acid treated with sufficient acid to give the monoester a pH of 6.5 to 7.0 in the presence of a trace of water.

6. The composition of claim 1 in which the ester of decaglycerol is derived from partially hydrogenated vegetable oil, contains about three fatty acid groups per molecule having from about 16 to about 18 carbon atoms, and has an iodine value not exceeding about 45.

7. The composition of claim 1 in which the half ester of dicarboxylic acid and monoester of straight chain aliphatic diol and fatty acid is stearoyl propylene glycol hydrogen succinate.

8. The composition of claim 1 in which the concentration of the half ester of dicarboxylic acid and monoester of straight chain aliphatic diol and fatty acid is from about 0.1% to about 1.0%.

9. An all-purpose plastic glyceride shortening composition for use in commercial baking operations containing as additives, by weight of the composition, (a) about 5.0% partially hydrogenated and superglycerinated vegetable oil containing about 40% monoglyceride of fatty acid having from about 16 to about 18 carbon atoms and having an iodine value of from about 70 to about 80, (b) about 1.0% polyoxyethylene sorbitan (20) monostearate acid-treated to provide a pH of 6.5 to 7.0 in the presence of a trace of water, (c) about 0.5% decaglycerol triester of partially hydrogenated vegetable oil containing fatty acid groups having from about 16 to about 18 carbon atoms and having an iodine value not exceeding about 45, and (d) about 0.25% stearoyl propylene glycol hydrogen succinate.

References Cited

UNITED STATES PATENTS

| | | | |
|---|---|---|---|
| 2,968,563 | 1/1961 | Houser | 99—118 |
| 3,293,272 | 12/1966 | Freund | 99—118 X |

OTHER REFERENCES

Baker's Digest, vol. 37, No. 5, Oct. 1963, pp. 72–75.

MAURICE W. GREENSTEIN, *Primary Examiner.*